United States Patent
Lee et al.

(10) Patent No.: US 6,804,608 B2
(45) Date of Patent: Oct. 12, 2004

(54) METHOD AND SYSTEM FOR CONDUCTING AIRBORNE GRAVITY SURVEYS

(75) Inventors: James Beresford Lee, New Lambton Heights (AU); Timothy John Monks, deceased, late of Brighton (AU), by Anglea Bowles, legal representative; Peter Mitchell Stone, Ripponlea (AU); Robert John Turner, Shortland (AU)

(73) Assignee: BHP Billiton Innovation Pty. Ltd., Melbourne (AU)

( * ) Notice: Subject to any disclaimer, the term of this patent is extended or adjusted under 35 U.S.C. 154(b) by 0 days.

(21) Appl. No.: 10/155,933

(22) Filed: May 24, 2002

(65) Prior Publication Data

US 2003/0033086 A1 Feb. 13, 2003

(30) Foreign Application Priority Data

Jun. 18, 2001 (AU) .............................................. PR5757

(51) Int. Cl.[7] .............................................. G01V 7/16
(52) U.S. Cl. ....................................................... 702/5
(58) Field of Search ........................ 702/5, 2; 356/5.04; 73/382 R, 382 G

(56) References Cited

U.S. PATENT DOCUMENTS

| | | | | |
|---|---|---|---|---|
| 3,731,537 A | * | 5/1973 | Trageser ................... | 73/382 R |
| 3,897,150 A | * | 7/1975 | Bridges et al. ............ | 356/5.04 |
| 5,086,396 A | * | 2/1992 | Waruszewski, Jr. ......... | 701/221 |
| 5,272,639 A | * | 12/1993 | McGuffin .................... | 701/207 |
| 5,402,340 A | * | 3/1995 | White et al. .................... | 702/5 |
| 5,557,397 A | | 9/1996 | Hyde et al. ................ | 356/5.01 |
| 5,661,649 A | * | 8/1997 | Carson et al. ................ | 702/2 |
| 5,878,356 A | * | 3/1999 | Garrot et al. .................. | 701/1 |
| 6,082,194 A | * | 7/2000 | Gladwin .................... | 73/382 G |
| 6,508,403 B2 | * | 1/2003 | Arsenault et al. ........... | 235/454 |
| 6,615,660 B1 | * | 9/2003 | Feinberg et al. .......... | 73/382 R |
| 6,658,935 B1 | * | 12/2003 | Feinberg ................... | 73/382 G |
| 2002/0092350 A1 | * | 7/2002 | Etkin et al. ............... | 73/382 G |

FOREIGN PATENT DOCUMENTS

| | | |
|---|---|---|
| AU | 700433 | 1/1999 |
| CA | 2198925 C | 1/2001 |
| JP | 99-170004/15 | 1/1999 |
| WO | 95/05615 A1 | 2/1995 |
| WO | WO 02/103399 A1 * | 12/2002 |

* cited by examiner

*Primary Examiner*—Hal Wachsman
*Assistant Examiner*—Anthony Gutierrez
(74) *Attorney, Agent, or Firm*—Gray Cary Ware & Freidenrich, LLP

(57) ABSTRACT

This invention concerns an aircraft equipped for conducting airborne gravity surveys. In another aspect it concerns a process for creating airborne gravity surveys. The aircraft is equipped to perform the method using measured attitude data, laser range data and scan angle data, and aircraft position data.

8 Claims, 2 Drawing Sheets

METHOD AND SYSTEM FOR CONDUCTING AIRBORNE GRAVITY SURVEYS

RELATED APPLICATION DATA

This application claims benefit under 35 USC § 119(a) to Australian Provisional Patent Application Serial No. PR 5757, filed Jun. 18, 2001, which is incorporated herein by reference in its entirety.

TECHNICAL FIELD

This invention concerns an aircraft equipped for conducting airborne gravity surveys. In another aspect it concerns a process for creating airborne gravity surveys.

BACKGROUND ART

In airborne gravity surveys, and particularly in gravity gradient surveys the major contributor to measured signal is often the topography. In such situations, very careful modeling of the topographic gradient signal is required in order to correctly identify that residual part of the signal which constitutes—exclusive of other generally smaller deterministic disturbances such as self-gradient—the effect of target anomalies. Vital to this correction is access to a suitably accurate digital elevation map (DEM) which is properly registered to the aircraft position. Such a DEM must cover both the survey area and a sufficient boundary beyond the survey extent. However, it is the topography closest to the aircraft, which will have the most profound effect on the gravity gradient signal.

SUMMARY OF THE INVENTION

In a first aspect, the invention is an aircraft for conducting airborne gravity surveys, equipped with:

An inertial platform in which sits a gravity gradiometer, and which operates to provide attitude measurements.

A gravity gradiometer to provide the gradient of gravity.

A laser scanner having a range of at least 200 m, a scan angle of at least +/−30 degrees recorded to an accuracy of at least 0.5 degrees, and a scan rate of at least 10 scans per second with a laser pulse rate of at least 10 kHz, to return range and scan angle measurements from the ground.

A GPS antennae to receive GPS data from which timing and position data can be retrieved.

A processor to generate a digital elevation map (DEM) using the laser range, scan angle, aircraft attitude and aircraft position data, and from which the gradient of gravity of the topography can be calculated.

A second ground-based GPS antenna and receiver may be provided at a reference location for differential correction of the aircraft mounted GPS receiver position.

The ground return data obtained using the invention is across a sufficiently wide swathe so that very adequate DEMs over the whole survey area can be produced. As a result, the scanner DEM will be correctly registered relative to the aircraft, especially in the region close to the aircraft where topographic gravity gradient effects are not inconsiderable. Also, scanner DEM's can be composed in remote regions where existing DEMs are inaccurate, out of date or unavailable—this enables the aircraft to collect valid data over almost any ground. Furthermore, the scanner DEMs will generally be more accurate than other commercially available DEMs.

A laser profilometer may be fitted adjacent to the scanner, to provide independent data to monitor the scanner integrity throughout a survey.

In order to transform scanner range data into ground return positions, it is necessary to combine the range data with a measure of the aircraft attitude, that is roll, pitch and heading available from the inertial platform, and the aircraft position available from the GPS. To do this the raw data streams from the laser scanner and the inertial platform are accurately time stamped with synchronisation pulses derived from the aircraft GPS. The raw GPS data from the aircraft and ground GPS receivers may be processed to provide sub-meter accuracy.

In another aspect the invention is a process for creating airborne gravity surveys using measured attitude data, laser range data and scan angle data, and aircraft position data. The process comprising the following steps:

Removing data having invalid values from the range data.

Interpolating the attitude and aircraft position data onto the range data time instances.

Vector rotating the range vector and if required the offset vector of the laser scanner from the GPS antenna about the GPS antenna to transform the range data into ground position data.

Discarding single point anomalies from individual selected scans.

Decimating the scans by selecting the points with the lowest ground position in a number of evenly spaced bins across the scan swathe.

Manufacturing a gridded version of the scanner ground position data set using the decimated ground return data.

Merging the gridded version with a less accurate but larger regional DEM.

The merging process may consist of the following steps: Overlaying the scanner DEM on a section of the regional DEM so that the regional DEM extends at least 5 km further than the scanner DEM in every direction. Tilting and shifting the regional DEM to match the scanner DEM at the boundary of the scanner DEM. And allowing the regional DEM to in-fill any internal gaps in the scanner DEM. The combined scanner and regional DEMs are used to calculate the gravity gradients which will result from the topography. The scanner DEM is used in the area it covers, while the regional DEM is used outside this area. There are public domain methods for this conversion of topography to gravity gradient.

BRIEF DESCRIPTION OF THE DRAWINGS

An example of the invention will now be described with reference to the accompanying drawings, in which.

BEST MODES OF THE INVENTION

Figure 1:
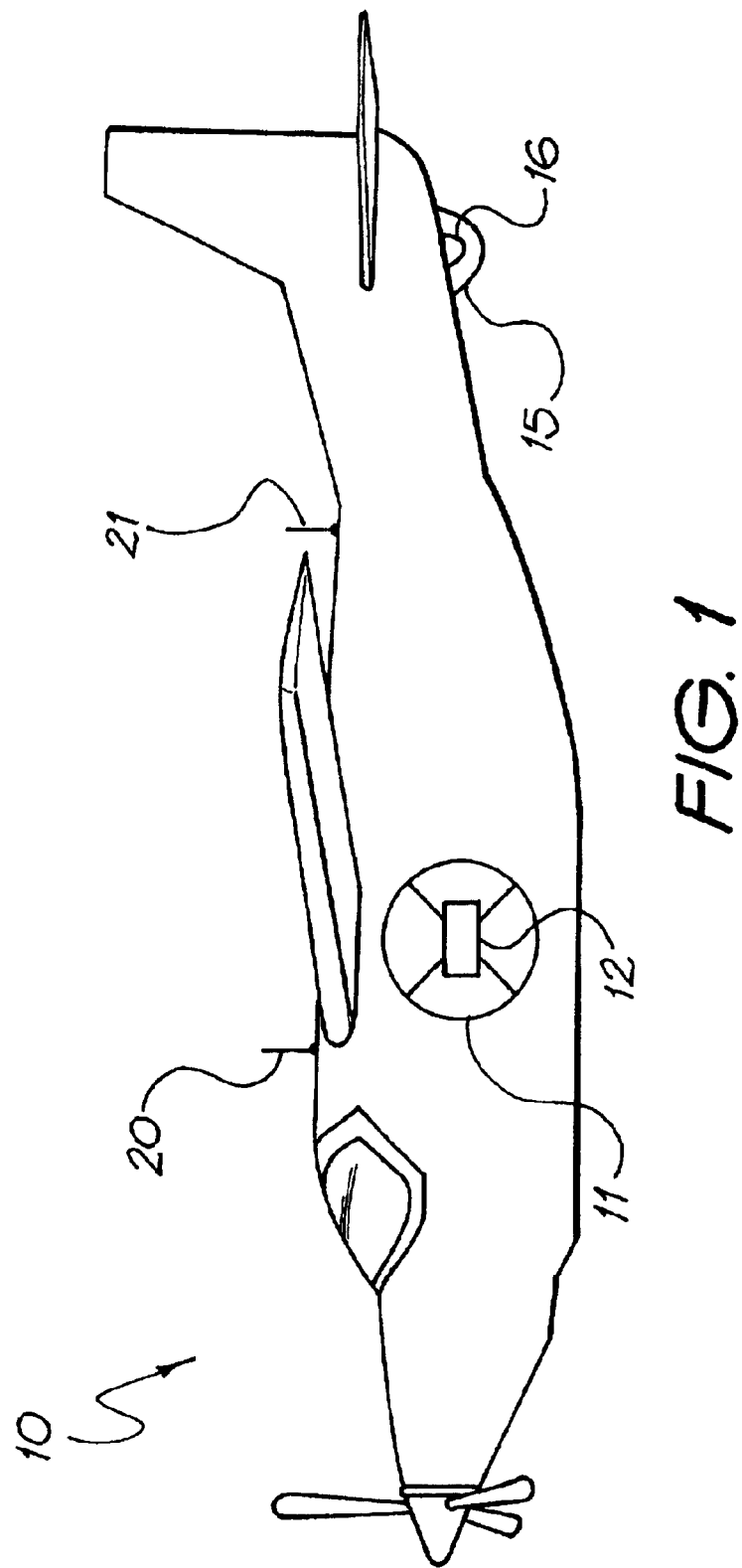
FIG. 1 is a schematic diagram of an aircraft.

A Cessna Grand Caravan aircraft 10 is equipped with an inertial platform 11 in which sits a gravity gradiometer 12. A Riegl laser scanner 15 is mounted under the tail of the aircraft. A laser profilometer 16 is also mounted under the tail of the aircraft to provide a check on scanner ground return accuracy. The aircraft is also fitted with dual frequency Dorne-Margolin GPS antennae 20 and NovAtel Millennium receivers 21. Thus equipped the aircraft is able to undertake airborne surveys of the local gravity field.

The inertial platform 11 provides very accurate measurements 30 of the attitude (roll, pitch and heading) of the aircraft, at a rate of 16 Hz, for range position correction.

The gravity gradiometer 12 provides a signal from which the instantaneous gradient of gravity can be derived.

The laser scanner 15 provides ground return data 31 in the form of range measurements and scan angle.

The GPS antennae 20 receives raw GPS data which are processed to find aircraft position data 32.

Survey Flying

In order to maximise the gradiometer's sensitivity to target signals, a gravity survey flight plan usually specifies nominal ground clearances of between 80 and 120 meters, dependent upon topographic relief. These low clearances enable the laser scanner instruments fitted to the aircraft to provide good quality and dense ground return data. The laser range, scan angle, aircraft attitude and aircraft position data are then used to generate digital elevation map (DEM) position data. The DEM is used to calculate the gravity gradient along the survey track of the gravity gradiometer so this can be subtracted from the measured gravity gradients to reveal gravity gradient anomalies which are not due to the topography.

The Laser Scanner

The laser scanner has a swathe of +/−40 degrees to give close to full coverage at 200 m line spacing and 100 m altitude and a laser range of at least 200 m to allow for slant angle and increased altitude over topography. The laser pulses at 12 kHz with a 33% duty cycle and returns 276 readings per scan line at a line rate of 20 Hz to give a separation of less than 3 m along the track and less than 1 m across track.

The scanner's nominal specifications are given below:

| Parameter | Nominal Value |
| --- | --- |
| Scan rate (per sec) | 20 |
| Returns per scan | 276 |
| Aircraft ground speed (m/s) | 50 |
| Scan angle limits (deg) | [340] |
| Ground clearance (m) | 100 |
| Scan separation along aircraft track (m) | 2.5 |
| Average scan separation across aircraft track (m) | 0.60 |
| Cross track scan swathe (m) | 167 |

In practice, the scanner performance can vary, with valid scan return density depending upon factors such as: The aircraft ground clearance (above 200 m clearance return density can be negligible). Ground coverage, for instance the return density over smooth or icy bodies of water is usually low and can vary widely according to foliage distribution and characteristics. Regular cleaning of the scanner window is required.

Scanner Calibration

Both the scanner and profilometer are carefully adjusted when installed so that the profilometer and the centre of the scan are approximately at nadir in the survey flight aircraft attitude. That is at zero pitch and zero roll. Additionally, the scan rotation direction must be colinear with the aircraft's principal axis. In practice, this perfect alignment is impossible to achieve, and it is necessary to perform calibration flights to determine the actual pointing offset of each instrument.

Scanner range and aircraft attitude data are collected whilst a set of rolling and pitching maneuvers is performed over a flat surface. A body of flat water with small wind induced rippling is preferred. A least squares optimisation engine is used to ascertain the best set of scanner pointing offsets such that the deviation from flatness of the estimated lake surface is minimised. The same approach is used to calibrate the profilometer. Pointing offsets for the aircraft fitted with both scanner and profilometer are given below:

| Instrument | [roll, pitch, heading] Pointing Offset (deg) | Calibration standard deviation from flatness of estimated lake surface (m) |
| --- | --- | --- |
| Scanner | −0.2, 2.8; 2.0 | 0.2 |
| Profilometer | 0.6, −0.27, NA | 0.2 |

The 0.2 m standard deviation from flatness of estimated lake surface reported for both scanner and profilometer is the best possible accuracy achievable with these instruments, accounting for all possible error sources from raw measurement through the geometric transformation to final ground position. Additional errors are experienced in surveys due to inadequate foliage penetration, built environment and horizontal position errors.

In order to transform scanner range data into ground return positions, it is necessary to combine the range data with a measure of the aircraft attitude, that is roll, pitch and heading available from the inertial platform, and the aircraft position from GPS receivers. Synchronisation of these data streams is achieved by using timing pulses which are exchanged between the separate instruments and are accurately timed by the GPS receiver.

Calculation of Aircraft Position

The aircraft and ground based GPS antennae receive raw GPS data, which are recorded at 2 Hz. Techniques which use these data to generate the instantaneous position of the aircraft to accuracy of less than 1 m are well known. An example is the GrafNav software product (available from Waypoint Consulting Inc).

Since the intrinsic accuracy of the scanner at low scan angles is very good, accounting for a ground height error of less than 0.1 m standard deviation. Taking into account that DGPS height errors are about 0.15 m, the resulting ground height error is estimated as 0.2 m standard deviation. This has been confirmed by an analysis of height differences in overlapping areas between adjacent lines. This estimate is characteristic of a lightly vegetated terrain. This level of topographic error has a negligible impact on the ability to identify target gravity anomalies arising from geological variations.

Calculation of Ground Position

Figure 2:
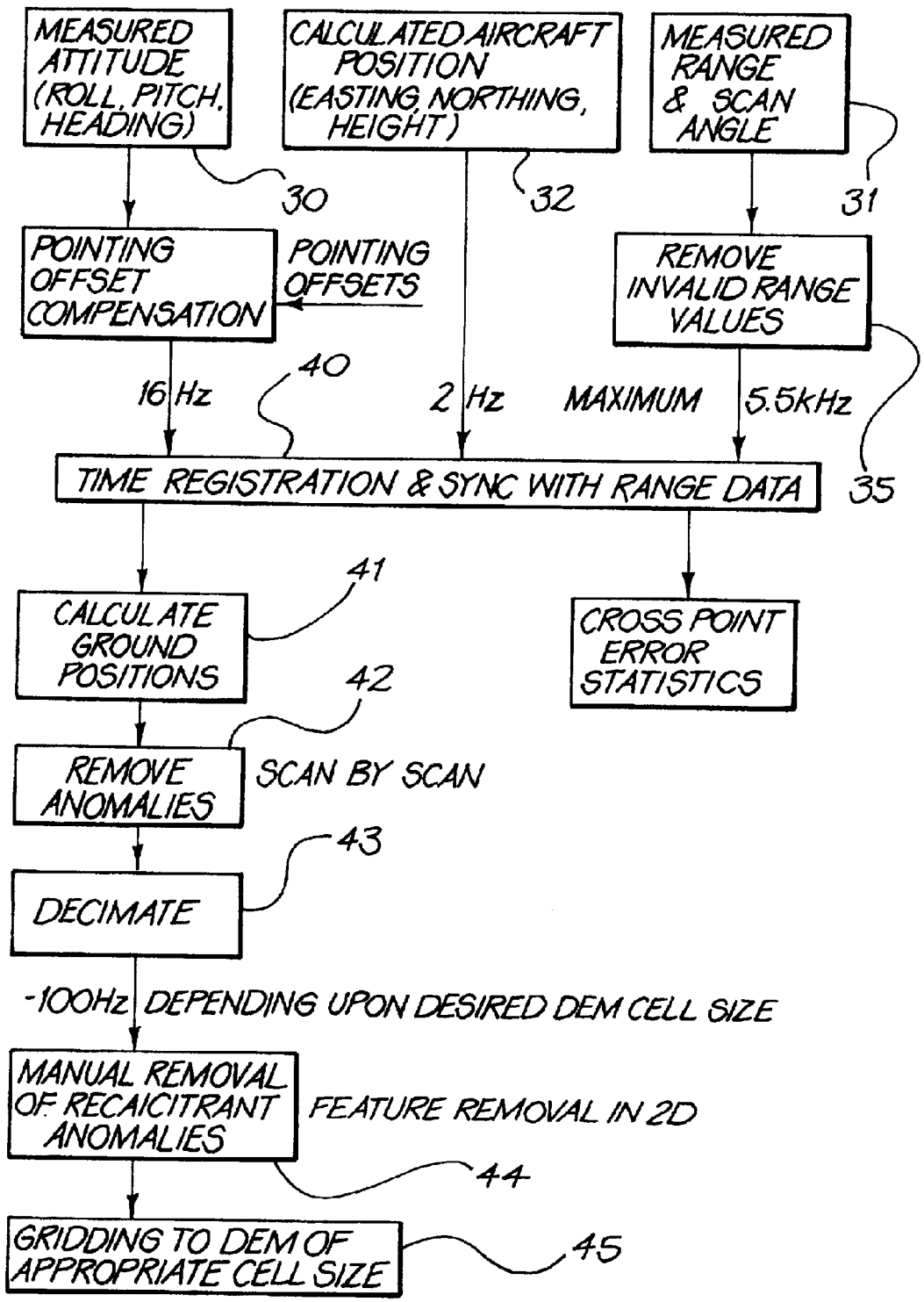
FIG. 2 is a flowchart for the production of scanner DEM.

FIG. 2 illustrates the processing steps required to construct a DEM from the measured attitude data 30, the scanner laser data range and scan angle data 31, and the calculated aircraft position 32. This process will now be described:

Remove Invalid Range Values 35

The raw range data usually contains a number of invalid range returns, which are recorded as values less than 20 meters. These are removed from the data stream.

Time Registration and Synchronising with Range Data 40

The lower rate attitude and aircraft position data are linearly interpolated onto the range data time instances. Processing of scanner calibration data has demonstrated that the interpolation of the low rate 2 Hz position data can result in ground position estimation errors of up to 0.2 m standard deviation during periods of extreme aircraft attitude change. However, in normal survey conditions, these extremes of attitude change are rarely encountered.

Calculate Ground Positions 41

The transformation of range data into ground position is achieved by performing a set of vector rotations of the range vector about the GPS antenna. These rotations account for heading, pitch and roll, compensated for their respective pointing offsets, yaw pointing offset and scan angle as well as the lever arm effect associated with the rear mounting of the scanner on the aircraft underbelly. The transformed range vector is then added to the aircraft position, giving the ground return position.

Range Anomalies 42 and Decimation 43

The laser scanner data has many more returns than are required to generate a sufficiently accurate DEM. It also contains many range values which are ranges to vegetation which may be several meters above ground level. The decimation process both reduces the number of range values to be used in the generation of the DEM, and eliminates the effect of the ranges to vegetation. The characteristic of the valid ground range values which is used to distinguish them from returns from vegetation, is that in a localised area the ground returns will be from lower points than returns from vegetation. The decimation process is to divide the scanner data into localised areas, either as sections of a single scan, or combinations of such sections on adjacent scans, making an area. The lowest height in each localised area is selected as a true ground return to be used in the DEM generation.

Following the automated decimation process, there may remain a few anomalous height data associated with dense vegetation or buildings for example. A manual step 44 of removing these anomalies may then be employed.

Creation of DEM 45

The decimated ground return data is then used to manufacture a gridded version of the scanner ground position data set, the scanner DEM. This is then merged with a less accurate but larger regional DEM. The merging process consists of the following steps: Overlaying the scanner DEM on a section of the regional DEM so that the regional DEM extends at least 5 km further than the scanner DEM in every direction. Tilting and shifting the regional DEM to match the scanner DEM at the boundary of the scanner DEM. And allowing the regional DEM to in-fill any internal gaps in the scanner DEM. The combined scanner and regional DEMs are used to calculate the gravity gradients which will result from the topography. The scanner DEM is used in the area it covers, while the regional DEM is used outside this area. There are public domain methods for this conversion of topography to gravity gradient. This produces gradient measurements corrected for topographic effects.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An aircraft for conducting airborne gravity surveys, equipped with:
   an inertial platform in which sits a gravity gradiometer, and which operates to provide attitude measurements;
   a gravity gradiometer to provide measurements of the gradient of gravity;
   a laser scanner to return range and scan angle measurements from the ground;
   a GPS antennae to receive GPS data from which timing and position data can be retrieved;
   a processor to generate a digital elevation map (DEM) using the laser range, scan angle, aircraft attitude and aircraft position data, and from which the gradient of gravity of the topography can be calculated and to subtract the calculated gradient of gravity to reveal gravity gradient anomalies which are not due to topography.

2. An aircraft according to claim 1, where the laser scanner has a range of at least 200 m, a scan angle of at least +/−30 degrees recorded to an accuracy of at least 0.5 degrees, and a scan rate of at least 10 scans per second with a laser pulse rate of at least 10 kHz.

3. An aircraft according to claim 1, further equipped with a laser profilometer fitted adjacent to the scanner, to provide independent data to monitor the scanner integrity throughout a survey.

4. An aircraft according to claim 1, where raw GPS data is processed to provide sub-meter accuracy.

5. A process for creating airborne gravity surveys using measured attitude data, laser range data and scan angle data, and aircraft position data to reveal gravity gradient anomalies, the process comprising the following steps:
   removing data having invalid values from the range data;
   interpolating the attitude and aircraft position data onto the range data time instances;
   vector rotating the range vector, defined by the laser range and scan angle, by the measured attitude to transform the range data into ground position data by applying the vector as an offset to the aircraft position;
   discarding single point anomalies from individual selected scans;
   decimating the scans by selecting the points with the lowest ground position in a number of evenly spaced bins across the scan swathe;
   manufacturing a scanner DEM as a gridded version of the scanner ground position data set using the decimated ground return data;
   measuring the gradient of gravity using a gravity gradiometer;
   using the DEM to calculate the gradient of gravity;
   subtracting the measured gradient of gravity from the calculated gradient of gravity to reveal gravity gradient anomalies which are not due to topography.

6. A method according to claim 5, comprising the further step of merging the gridded version with a less accurate but larger regional DEM.

7. A method according to claim 6, where the merging process consists of the following steps:
   insertion of the scanner DEM inside the regional DEM, allowing a regional "frame" to be at least 5000 m;
   tilting and shifting of the regional DEM to match the scanner DEM boundary conditions; and
   allowing the regional DEM to in-fill any internal gaps in the scanner DEM.

8. A process for creating airborne gravity surveys using measured attitude data, laser range data and scan angle data, and aircraft position data, the process comprising the following steps:
   removing data having invalid values from the range data;
   interpolating the attitude and aircraft position data onto the range data time instances;
   vector rotating the range vector, defined by the laser range and scan angle, by the measured attitude to transform the range data into ground position data by applying the vector as an offset to the aircraft position;

discarding single point anomalies from individual selected scans;

decimating the scans by selecting the points with the lowest ground position in a number of evenly spaced bins across the scan swathe;

manufacturing a scanner DEM as a gridded version of the scanner ground position data set using the decimated ground return data;

merging the gridded version with a less accurate but larger regional DEM, where the merging process consists of the following steps:

insertion of the scanner DEM inside the regional DEM, allowing a regional "frame" to be at least 5000 m;

tilting and shifting of the regional DEM to match the scanner DEM boundary conditions; and allowing the regional DEM to in-fill any internal gaps in the scanner DEM.

* * * * *